Aug. 18, 1959     P. G. CAISSE     2,899,699
DUSTPAN AND HANDLE
Filed Oct. 19, 1956
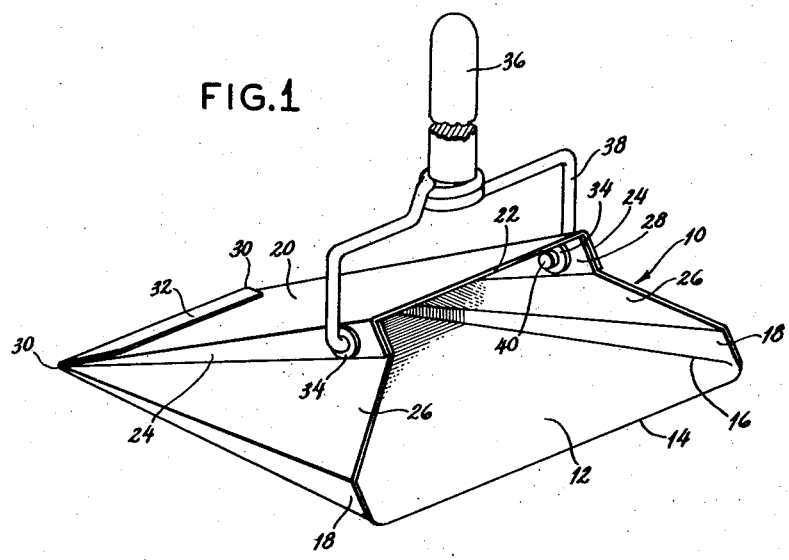
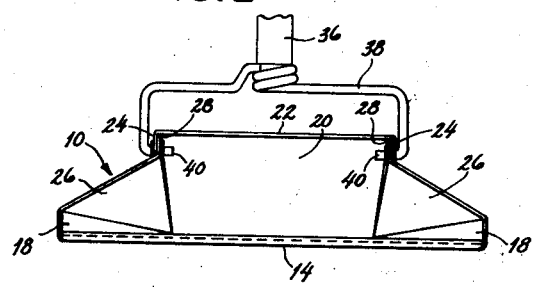
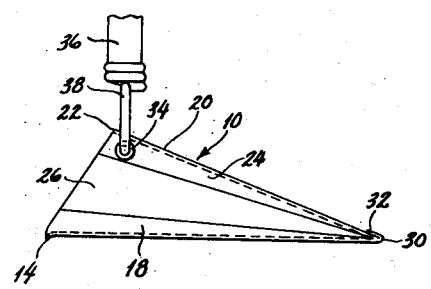
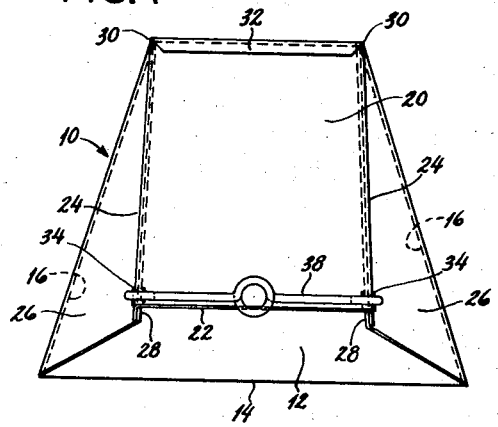
INVENTOR
PAUL G. CAISSE
BY Teller & McCormick
ATTORNEYS United States Patent Office 2,899,699
Patented Aug. 18, 1959

2,899,699

DUSTPAN AND HANDLE

Paul G. Caisse, Hartford, Conn., assignor to The Fuller Brush Company, Hartford, Conn., a corporation of Connecticut Application October 19, 1956, Serial No. 617,011

9 Claims. (Cl. 15—257.4)

The invention relates to a dustpan and a handle therefor, and the general object of the invention is to provide a dustpan and handle assembly which is very simple and inexpensive. A more specific object of the invention is to provide a simple and inexpensive dustpan adapted for connection with a handle and having a minimum number of parts and so formed that the parts thereof may be readily connected with each other.

The drawing shows in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a perspective view of a dustpan and handle embodying the invention.

Fig. 2 is a front view.

Fig. 3 is a side view.

Fig. 4 is a plan view.

Referring to the drawing, 10 represents a dustpan embodying the invention, said pan including a substantially horizontal bottom wall 12 having parallel front and rear edges, said front edge being shown at 14 on a downwardly curved lip. The bottom wall 12 has rearwardly converging sides 16, 16. The pan 10 also comprises two substantially vertical rearwardly converging lower side walls 18, 18 extending upwardly from the converging sides 16, 16 of the bottom wall.

The pan 10 has a top wall 20 located above the bottom wall and having parallel sides, said top wall being narrower than said bottom wall except at the rear, where the width is the same. The top wall is considerably shorter than the bottom wall and the front edge 22 of the top wall is spaced substantially rearwardly from the front edge 14 of the bottom wall. Two substantially vertical parallel upper side walls 24, 24 extend downwardly from the parallel sides of the top wall.

The pan 10 includes two intermediate side walls 26, 26 which are oppositely inclined upwardly and inwardly and which connect the lower side walls 18, 18 with the upper side walls 24, 24. Preferably the lower side walls 18, 18 and the intermediate side walls 26, 26 and the upper side walls 24, 24 taper rearwardly so that the lateral edges of the bottom and top walls and the top and bottom edges of the side walls or side wall portions all converge rearwardly toward common points at the rear. Otherwise stated, said edges approximately meet at two transversely spaced points 30, 30. This brings the rear edge of the top wall 20 at least approximately into engagement with the rear edge of the bottom wall 12.

As stated, the front edge of the top wall 20 is spaced rearwardly from the front edge of the bottom wall 12. Preferably, the side walls 18, 18, 24, 24 and 26, 26 all terminate at the front in an inclined plane through the front edges of said bottom and top walls.

The bottom wall 12 and the lower side walls 18, 18 and the intermediate side walls 26, 26 are preferably all formed from a single sheet of metal which is cut and bent or shaped to provide said several walls. Said sheet is sometimes hereinafter referred to as the first sheet. The top wall 20 and the upper side walls 24, 24 are preferably all formed from a single sheet of metal which is cut and bent as necessary. The said sheet is sometimes hereinafter referred to as the second sheet. Preferably integral flanges 28, 28 are provided on the intermediate side walls 26, 26 which flanges extend upwardly at the inner sides of the upper side walls 24, 24.

One of said walls 12 and 20 is provided at the rear with a flange 32 that is folded to engage the other wall and to provide a connection between said walls. Preferably and as shown, said flange 32 is provided on the bottom wall 12 and it is bent or folded upwardly and forwardly to overlie the top wall 20 at the rear edge thereof. Rivets 34, 34 are provided for holding the top wall 20 near the front thereof, said rivets extending through the upper side walls 24, 24 near the fronts thereof and through the corresponding flanges 28, 28. The dustpan 10 comprises only two major sheet metal parts, and the flange 32 and the rivets 34, 34 constitute the sole means for holding said parts in fixed relationship.

A handle 36 is provided and this includes a transverse bail 38 having inwardly extending pintles 40, 40 which pivotally connect the handle with the pan. Preferably said rivets 34, 34 are transversely aligned and are hollow and constitute bearings for said pintles 40, 40 which extend through the holes in said rivets.

The rivets are so located that the handle, when upright, is in a plane spaced rearwardly from the front edge 14 so as to allow ample room for a broom in sweeping dust and other material into the pan. The handle, although at the rear of the front edge 14, is spaced forwardly from the center of gravity of the pan so that the rear portion of said pan will always swing downwardly when the pan is lifted by the handle. This causes dust and other material to move into the enclosed space at the rear of the pan where it is retained until the pan is manually tilted forwardly for dumping.

The invention claimed is:

1. A dustpan including a substantially horizontal bottom wall having parallel front and rear edges and having rearwardly converging sides, a top wall narrower than said bottom wall and having substantially parallel sides symmetrically disposed relatively to the converging sides of the bottom wall, two substantially vertical rearwardly converging lower side walls extending upwardly from the converging sides of the bottom wall, two substantially vertical parallel upper side walls extending downwardly from the parallel sides of the top wall, and two intermediate side walls inclined upwardly and inwardly and connecting the upper edges of the lower side walls with the lower edges of the upper side walls.

2. A dustpan as set forth in claim 1, wherein the width of the top wall is approximately the same as the width of the bottom wall at the rear of the latter, wherein the lateral edges of the bottom and top walls and the top and bottom edges of the lower and intermediate and upper side walls all converge rearwardly toward common points at the rear, and wherein said top and side walls all terminate at the front in a plane through the front edge of the bottom and inclined upwardly and rearwardly.

3. A dustpan and handle assembly comprising a dustpan as set forth in claim 1 and also comprising a handle including a transversely extending bail provided with inwardly extending pintles which pivotally connect the handle to said substantially parallel upper side walls of the pan near the front ends thereof.

4. A dustpan including a first metallic sheet shaped to provide a substantially horizontal bottom wall having parallel front and rear edges and having rearwardly converging sides and to provide two substantially vertical rearwardly converging lower side walls extending upwardly from the converging sides of the bottom wall and to provide two intermediate side walls extending upwardly and inwardly from the upper edges of the lower side walls, a second metallic sheet shaped to provide a top wall narrower than said bottom wall and having substantially parallel sides and to provide substantially vertical parallel upper side walls extending downwardly from the parallel sides of the top wall, and means for connecting said second sheet with said first sheet in such relationship that the parallel sides of the top wall are symmetrrically disposed relatively to the converging sides of the bottom wall and that the upper side walls on the second sheet are closely adjacent the intermediate side walls on the first sheet.

5. A dustpan as set forth in claim 4, wherein said connecting means includes flanges on said first sheet which extend upwardly from the upper edges of the intermediate side walls and engage the upper side walls at the inner faces thereof, and wherein said connecting means also includes devices near the front which serve to directly connect said upper side walls with said flanges.

6. A dustpan as set forth in claim 5, wherein said devices near the front are transversely aligned hollow rivets connecting said upper side walls with said flanges, said hollow rivets being adapted to serve as bearings for the pintles of a handle.

7. A dustpan and handle assembly comprising a dustpan as set forth in claim 6, and also comprising a handle including a transversely extending bail provided with inwardly extending pintles which enter said hollow rivets and pivotally connect said handle to said substantially parallel upper side walls of the pan.

8. A dustpan as set forth in claim 5, wherein the width of the top wall is approximately the same as the width of the bottom wall at the rear thereof, and wherein the lateral edges of the bottom and top walls and the top and bottom edges of the lower and intermediate and upper side walls all converge rearwardly toward common points at the rear.

9. A dustpan as set forth in claim 8, wherein said connecting means also includes a flange at the rear of one of said sheets which is folded forwardly to engage and hold the other sheet.

References Cited in the file of this patent

UNITED STATES PATENTS

| | | |
|---|---|---|
| 614,858 | Grove | Nov. 29, 1898 |
| 904,500 | Babbitt et al. | Nov. 24, 1908 |
| 1,346,958 | Hazen | July 20, 1920 |

FOREIGN PATENTS

| | | |
|---|---|---|
| 345,927 | Great Britain | Apr. 2, 1931 |